United States Patent Office 3,121,697
Patented Feb. 18, 1964

3,121,697
POLY-AMIDO-ETHYL-PHOSPHITES, METHOD OF PREPARATION, AND BLENDS THEREOF WITH PHENOLALDEHYDE RESINS
Jacques Georges Charles Girard, Bezons, André Thiot, Houilles, and Georges Quesnel, Suresnes, France, assignors, by mesne assignments, to La Bakelite, a French company, and Omnium de Produits Chimiques pour l'Industrie et l'Agriculture "OPCIA," Paris, France, a French company
No Drawing. Filed Oct. 26, 1959, Ser. No. 848,535
Claims priority, application France Oct. 30, 1958
10 Claims. (Cl. 260—2)

The present invention relates to a procedure for the preparation of flame-proofed materials.

An object of the present invention is to provide methods of preparation of the polycondensation products of monoethanolamine and phosphorous acid or its derivatives and also to provide a complex consisting of modified phenolic resins and the said polycondensation product, suitable for incorporation with other materials to produce flameproofed materials.

We have found that by mixing modified phenolic resins of the resol type with the products resulting from the polycondensation of monoethanolamine and phosphorous acid or its derivatives, we obtain a complex which can be used to produce flame-proofed materials, by incorporating it into organic or mineral fillers or layers by the normal methods of agglomeration, lamination, moulding and surface coating.

Suitable fillers or layers used according to the invention are those well-known in the art, such as are exemplified in standard works e.g. British Plastics Year Book, 1958 (for instance asbestos or kraft paper).

Polycondensation products of monoethanolamine and phosphorous acid or its organic derivatives are referred to hereafter as poly-amido-ethyl-phosphites.

According to the present invention there is provided a process for the preparation of poly-amido-ethyl-phosphites, as defined, comprising an esterification or transesterification reaction and an amidation reaction between monoethanolamine and phosphorous acid or its derivatives.

Further according to the present invention there are provided organo-phosphorus phenoplast complexes, formed by mixing poly-amido-ethyl-phosphites and resins of the resol type which are free from unreacted aldehyde and are compatible with the said phosphites.

The products of polycondensation of monoethanolamine and phosphorous acid or its organic derivatives correspond to one or other of the Formulae I or II given below. In Formula I, the phosphorus atom is in its tervalent form (phosphite) and in Formula II, it is in its quinquivalent form (phosphonate).

(Formula I)
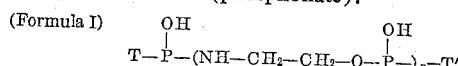

(Formula II)
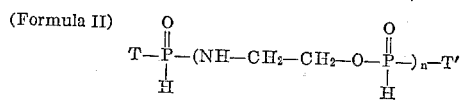

where $n$ is an integer greater than zero, T and T' represent the terminal groups which may be the same or different and which vary according to the method of preparation. For example, T and T' may be selected from the following groups —NHCH$_2$CH$_2$OH, —OCH$_2$CH$_2$NH$_2$, OH, or —OR (where R represents a substituted or unsubstituted alkyl or aryl radical).

Such polycondensation products are fusible colourless solids, and are compatible with specially modified resol type resins, the preparation of which is described hereafter. They can be heated up to a temperature of 300° C., without decomposing and are soluble in polar solvents, e.g. water and alcohol and insoluble in non-polar solvents.

In manipulating (according to the invention) the poly-amido-ethyl-phosphites they may become partially oxidised to poly-amido-ethyl-phosphates without losing their essential qualities to any great extent.

We have found four methods suitable for obtaining the poly-amido-ethyl-phosphites.

According to the first method one molecule of phosphorous acid is reacted with one molecule monoethanolamine thus eliminating, by an esterification and amidation reaction at least two molecules of water, according to the following equations (where $n$ is an integer greater than zero):

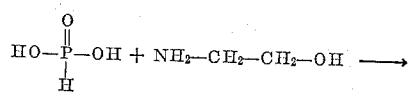

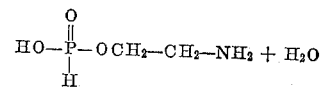

and

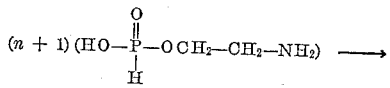

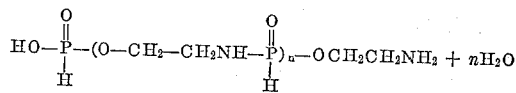

According to the second method, one molecule of monoethanolamine is reacted with at least one molecule of dialkyl or diaryl phosphite thus eliminating, by a transesterification and amidation reaction, at least two molecules of an alcohol or phenol, according to the following equations (where $n$ is an integer greater than zero):

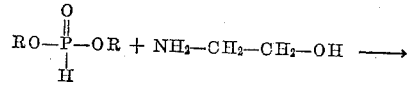

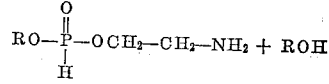

and

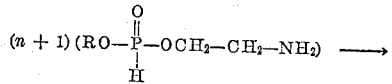

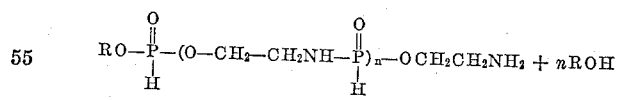

According to the third method, at least two molecules of monoethanolamine are reacted with one molecule of dialkyl or diaryl phosphite, thus eliminating, by transesterification, two molecules of an alcohol or phenol. This reaction is followed by an amidation reaction to eliminate at least 1 molecule of monoethanolamine. These reactions are illustrated by the following equations (where $n$ is an integer greater than zero):

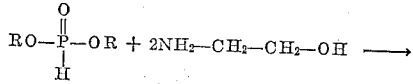

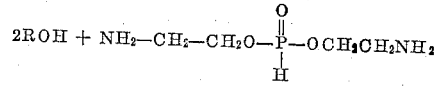

and

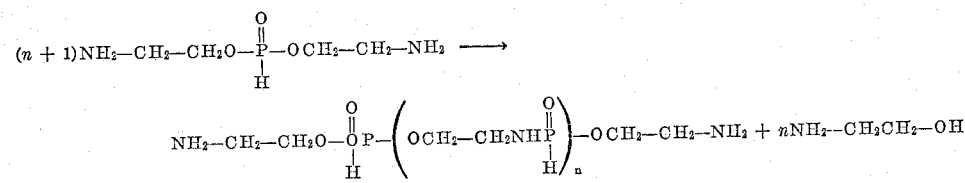

According to the fourth method, which is essentially a combination of the second and third methods, between 1 and 2 molecules of monoethanolamine are reacted with 1 molecule of a dialkyl or diaryl phosphite.

In these four procedures we have found that it is advantageous to carry out the initial steps of esterification or transesterification at temperatures between 80° and 150° C. and at ordinary pressure or under vacuum. The exact temperature will depend on the alcohol or phenol which is being driven off during the recation. We have found that it is convenient to carry out the amidation reaction at elevated temperatures up to 250° C. and preferably under vacuum to ensure the elimination of the last molecule of alcohol or phenol, or the molecule of ethanolamine, or the excess phosphite, as the case may be.

The specially modified phenolic resins of the present invention are of the resol type and are prepared by the well-known condensation reaction between one molecule of a phenol and at least one molecule of an aldehyde. At the end of the reaction there is added urea, ammonia, or any aminated base which is capable of reacting with an aldehyde, to eliminate the excess aldehyde. The reaction is advantageously catalysed by bases such as for example, barium or sodium hydroxide. These resins are compatible with the poly-amido-ethyl-phosphites and are sufficiently unreactive to water, after the final polycondensation, to protect by blocking in the 3 dimensional lattice formed, the poly-amido-ethyl-phosphites. Care must be taken to eliminate the free aldehyde at the end of the reaction, since this would react with the poly-amido-ethyl-phosphites to form unwanted acid which would impair the stability of the complex.

The preparation of the complex is carried out by mixing, in appropriate proportions, the phenolic resin, modified as above, with the poly-amido-ethyl-phosphite. The phenolic resin and poly-amido-ethyl-phosphite complex can be prepared even without the use of a solvent in a mixer or calender. Alternatively, they may be mixed by dissolving in common solvents such as for example water or alcohol; the solvent chosen depending on the nature of the phenolic resin used and the pH of the solution being between 6 and 8 and preferably between 6.8 and 7.4.

The solutions of the complex are advantageously kept between temperatures of 1° C. and 10° C., preferably around 7° C.

As stated above, the complex serves as a bonding agent for organic or mineral fillers or layers by the processes of agglomeration, laminating, cementing, moulding, surface coating, etc., to enable the direct preparation of flameproofed materials.

The following examples serve to illustrate the preparation of poly-amido-ethyl-phosphites (Examples 1, 2, 3), modified phenoplast resins of the resol type (Example 4), the complex formed by the mixture of the resins and the poly-amido-ethyl-phosphites (Example 5), a decorative laminate (Example 6).

Example 1

*Apparatus.*—The apparatus, which is adapted for use under vacuum, consists of a jacketed reaction vessel of 100 litres capacity, fitted with a stirrer, thermometer, valve permitting the introduction of liquids, and surmounted by a distillation column connected to a condenser and receiver. The apparatus is also provided with a valve suitable for rapid emptying of the entire apparatus.

*Starting materials.*—58 kg. of 70% phosphorous acid ($H_3PO_3$) and 30–31 kg. of monoethanolamine.

*Mode of operation.*—The phosphorous acid is introduced into the reaction vessel and a vacuum is established. The monoethanolamine is then added slowly with stirring. The heat of the reaction causes the water to distil over. When all the monoethanolamine has been added, the pH of the reaction mixture is checked. This should be around 4.3, but if it is not, it can easily be adjusted by the addition of small quantities of monoethanolamine or phosphorous acid. The reaction mixture is then gradually heated until the temperature reaches 180° C. and is then maintained at this temperature for about 6 hours. The extent of the reaction can be checked by observing the quantity of water collected. When about 18 litres of water have distilled over, the heating is discontinued and the vessel is allowed to cool to 80° C. The viscous residue is then transferred to a suitable container. It becomes a compact mass on cooling.

N.B.: The use of a higher temperature requires a shorter heating time. The product can be heated up to temperatures around 220° C. without decomposing.

Example 2

10 gram-moles of dimethyl phosphite are placed in a 3 litres three necked vacuum flask fitted with a column, stirrer, separating funnel and thermometer. 10 gram-moles of monoethanolamine are placed in the funnel. The flask and contents are heated up to 100° C. The dimethyl phosphite is agitated and the monoethanolamine is then added dropwise from the funnel. As the reaction proceeds, the methyl alcohol liberated distils over and is condensed. The reaction mixture gradually thickens. When all the monoethanolamine has been added, the reaction mass is then heated to 220° C. under vacuum. When the volatile products stop distilling over, reaction is complete and the residual mass is then transferred, while still hot, to a suitable container and allowed to cool.

Example 3

Using the apparatus described in Example 2, 20 gram-moles of monoethanolamine are placed in the flask and the flask is heated to 100° C. 10 gram-moles of diethyl phosphite are then added dropwise from the funnel. 20 gram-moles alcohol distil over and are condensed. When all the phosphite has been added, the reaction mass is heated to 230° C. under vacuum. 10 gram-moles monoethanolamine distil over and are recovered. When, at this temperature, there is no longer any volatile product distilling over, the heating is stopped and the product is isolated as in the previous example.

Example 4

In this example all parts are parts by weight.

(a) First type: A mixture, consisting of 100 parts phenol, 160 parts of a 37% solution of formaldehyde and 5 parts barium hydroxide, is slowly heated to 60° C. and kept at this temperature for 30 minutes by successive chillings. The mixture is then heated to boiling point and maintained at this temperature for 10 minutes. At the end of this time, the resin mixture is cooled, neutralised using 30% solution of sulphuric acid, and filtered off. The resin obtained has the following composition:

Dry solids _____ percent__ 44
pH _____ 7.4
Free phenol _____ percent__ 3
Free formaldehyde _____ do____ 3

The resin is then put in a mixer and brought up to a temperature of 60° C. The theoretical amount of urea necessary for reacting with the free formaldehyde to form methylol urea, is then added over a period of ¼ hour. The resin is then concentrated under vacuum to obtain the desired content of product on a dry-matter basis.

This resin, by virtue of its constitution, has a remarkable resistance to water.

(b) Another type of resin: A mixture consisting of 100 parts phenol, 130 parts of 37% formaldehyde and 1.5 parts sodium hydroxide is heated to 60° C. and maintained at this temperature for 1 hour. The mixture is then brought to a temperature of 85° C. and maintained at this temperature for a further hour. The mixture is then cooled to 40° C., and the free formaldehyde is reacted with ammonia.

(c) Another type of resin: A mixture consisting of 100 parts phenol, 100 parts 37% formaldehyde and 4 parts hexamethylenetetramine is heated to boiling point and kept at this temperature for 40 mins. The mixture is then distilled under vacuum until a brittle resin is obtained. An alcoholic solution of the resin is then obtained by dissolving it in 40 parts ethyl alcohol and reacting the free formaldehyde with ammonia.

*Example 5*

(a) 80 parts of the poly-amido-ethyl-phosphite are dissolved in 20 parts water in a flask fitted with an agitator and heated by means of a jacket. The phosphite rapidly dissolves at a temperature of 40° C.

The phenolic resin prepared according to Example 4, type (a) is concentrated to a dry-matter content of 80%.

20 parts of the phosphite solution are added to 100 parts of the phenolic resin. The complex formed is then cooled to 10° C. and stored at this temperature.

(b) 60 parts of the poly-amido-ethyl-phosphite are dissolved in a suitable quantity of ethyl alcohol by mixing in a vessel which is fitted with an agitator. The phosphite does dissolve without the application of heat but dissolution is more rapid if a gentle heat is applied. 10 parts of this alcoholic solution of phosphite are added to 100 parts of the phenolic resin as prepared in Example 4 type (c). The complex formed is then stored at a temperature of 15° C., although it is fairly stable at 20° C.

*Example 6*

To make decorative laminates, a mixture consisting of 10% of the poly-amido-ethyl-phosphite and 90% of phenolic resin of 70% dry-matter content is used. Before use, the complex is brought to a dry-matter content of 50% by the addition of a 50/50 water/alcohol solution. Then, for example, a kraft-paper 80 gm./m. square is impregnated.

After drying in a tunnel oven, the amount of volatile matter in the paper is between 2 and 3.5% measured at 150° C. during 5 minutes and the amount of resinous matter of the paper is around 30-35%.

The decorative laminate is made according to the usual procedure of successively applying a melamine overlay, a decorative leaf, a melamine barrier, a sandwich of 6-8 sheets of kraft-paper impregnated with the phenol phosphite complex, a balancing sheet, the whole being pressed for 2 hours at a temperature of 135° C.

The laminate thus prepared will not burn when it is put into contact with a flame such as that of a Bunsen burner and passes the standard regulation non-inflammability tests. (Journal Officiel de la République Française, Sécurité Contre l'Incendie, January, 1958, No. 58–125.)

What we claim is:

1. A process for the preparation of poly-amido-ethyl-phosphites, comprising the step of heating 2-hydroxy-ethyl-amine with a phosphorus compound selected from the group consisting of phosphorous acid, dialkyl and diaryl phosphites at a temperature of at least 80° C.

2. A process for the preparation of poly-amido-ethyl-phosphites, comprising the steps of heating 2-hydroxy-ethylamine with a phosphorus compound selected from the group consisting or phosphorous acid, dialkyl and diaryl phosphites, first at a temperature between 80 and 150° C., then under vacuum at a temperature between 140° C. and 250° C.

3. A process as claimed in claim 2, in which the first heating step is operated at atmospheric pressure.

4. A process as claimed in claim 2 in which the first heating step is operated under vacuum.

5. A process for the preparation of poly-amido-ethyl-phosphite based organo-phosphorus phenoplast complexes comprising the steps of heating 2-hydroxy-ethylamine with a phosphorus compound selected from the group consisting of phosphorous acid, dialkyl and diaryl phosphites first at a temperature between 80 and 150° C., then at a temperature between 140° C. and 250° C. thereby obtaining a poly-amido-ethyl-phosphite and mixing said phosphite with a resole phenol formaldehyde resin and compatible with the said phosphites.

6. A process for the preparation of poly-amido-ethyl phosphites comprising heating to reaction temperatures of at least 80° C. a mixture of 2-hydroxy-ethylamine and phosphorous acid in substantially equimolecular proportions.

7. A process for the preparation of poly-amido-ethyl phosphites comprising heating to reaction temperatures of at least 80° C. at least one mole of 2-hydroxy-ethylamine per mole of dialkyl phosphite.

8. A process for the preparation of poly-amido-ethyl phosphites comprising heating to reaction temperatures of at least 80° C. at least one mole of 2-hydroxy-ethylamine per mole of a diaryl phosphite.

9. A flame proofing substance comprising a poly-amido-ethyl phosphite having the structural formula:

$$T-POH-(NH-CH_2-CH_2-O-POH)_n-T'$$

in which $n$ is an integer greater than zero and T and T' are radicals selected from the group consisting of $$-NHCH_2CH_2OH$$

$-OCH_2CH_2NH_2$, $-OH$, $-O$-alkyl and $-O$-aryl.

10. A flame proofed synthetic resin consisting of a complex of a poly-amido-ethyl phosphite having the structural formula:

$$T-POH-(NH-CH_2-CH_2-O-POH)_n-T'$$

in which $n$ is an integer greater than zero and T and T' are radicals selected from the group consisting of $$-NHCH_2CH_2OH$$

$-OCH_2CH_2NH_2$, $-OH$, $-O$-alkyl, or $-O$-aryl and of a resole phenol-formaldehyde resin compatible with said phosphite.

References Cited in the file of this patent

UNITED STATES PATENTS

| | | |
|---|---|---|
| 2,596,936 | Nielsen et al. | May 13, 1952 |
| 2,841,607 | Hechenbleikner et al. | July 1, 1958 |
| 2,847,442 | Sallmann | Aug. 12, 1958 |

UNITED STATES PATENT OFFICE
CERTIFICATE OF CORRECTION

Patent No. 3,121,697            February 18, 1964

Jacques Georges Charles Girard et al.

It is hereby certified that error appears in the above numbered patent requiring correction and that the said Letters Patent should read as corrected below.

Column 3, lines 2 to 12, for the first part of the second formula reading:

column 6, line 29, strike out "and".

Signed and sealed this 7th day of July 1964.

(SEAL)
Attest:

ERNEST W. SWIDER            EDWARD J. BRENNER

Attesting Officer            Commissioner of Patents